United States Patent
Yeom (10) Patent No.: US 7,289,486 B2
(45) Date of Patent: Oct. 30, 2007

(54) METHOD FOR CALL PROCESSING AND LINK TEST IN A VOIP GATEWAY AND SYSTEM THEREOF

(75) Inventor: Eung-Moon Yeom, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 853 days.

(21) Appl. No.: 10/732,525

(22) Filed: Dec. 11, 2003

(65) Prior Publication Data

US 2004/0120312 A1 Jun. 24, 2004

(30) Foreign Application Priority Data

Dec. 16, 2002 (KR) ............ 10-2002-0080465

(51) Int. Cl.
H04L 12/56 (2006.01)
(52) U.S. Cl. ............ 370/352; 370/255; 370/355; 370/400; 370/401
(58) Field of Classification Search ........ 370/252–257, 370/400–401, 426, 352–357; 379/220.01, 379/221.01, 221.14, 226, 229
See application file for complete search history.

(56) References Cited

U.S. PATENT DOCUMENTS 6,721,284 B1 * 4/2004 Mottishaw et al. ......... 370/255
2002/0188755 A1 * 12/2002 Yeom ....................... 709/238
2003/0156579 A1 * 8/2003 Cho ........................... 370/352
2005/0180396 A1 * 8/2005 Lim ........................... 370/352

FOREIGN PATENT DOCUMENTS

| EP | 1 014 633 A2 | 8/2002 |
| EP | 1 014 633 A3 | 8/2002 |
| JP | 2003-198724 | 11/2003 |

OTHER PUBLICATIONS

Search and Examination Report under Sections 17 & 18(3) from the British Patent Office issued in Applicant's corresponding British Patent Application No. GB0329005.3 (dated Apr. 23, 2004).

* cited by examiner

Primary Examiner—Binh K. Tieu
(74) Attorney, Agent, or Firm—Robert E. Bushnell, Esq.

(57) ABSTRACT

A method for call processing and link test in a Voice over Internet Protocol (VoIP) Gateway and system thereof. When a Gateway with Gatekeeper is operated in manual Registration/Admission/Status (RAS) mode, the link test is selectively performed depending on the status of the Gatekeeper according to an access code, whereby traffic of the Gatekeeper can be dispersed. In addition, when the Gateway with Gatekeeper is operated in manual RAS mode, depending on the status (i.e. enable or disable) of the Gatekeeper according to the access code, VoIP call processing or call routing service is divided into public VoIP service for charging a VoIP call and local VoIP service with free of charge. In case there is no routable Gateway during the VoIP call service, the call is detoured to Public Switched Telephone Network (PSTN) network for processing. As a result, service reliability of VoIP network is greatly improved.

17 Claims, 4 Drawing Sheets

FIG. 2

| No. | Items | Value | Default |
|---|---|---|---|
| 0 | Gatekeeper Connection | Enable | Disable |
|   | Gatekeeper Status | Unregistration | -- |
| 1 | RAS Method | Manual | Auto |
| 2 | Registration Type | E.164 in GW Name | GW Name |
| 3 | Gatekeeper Type | Enable | Other_GK |
| 4 | GW Routing In GK mode | Enable | Disable |
| 5 | Gatekeeper IP | 165.213.87.66 | -- |
| 6 | Gatekeeper Alias | Gatekeeper | -- |
| 7 | Alternative Gatekeeper IP | 0.0.0.0 | -- |
| 8 | Gatekeeper Down Option | Alternative GK | Alternative |
| 9 | Gateway Name \| H.323 ID | SMG3200 | -- |
| 10 | \| E.164 | 3200 | -- |

FIG. 3

| No. | Access Code | Access Code Length | Del_Length | IP table index for gateway | GK Use |
|---|---|---|---|---|---|
| 0 | 02 | 2 | 2 | x | Yes |
| 1 | 031 | 3 | 3 | x | No |
| 2 | 042 | 3 | 0 | x | Yes |
| 3 | 053 | 3 | 0 | x | No |
| 4 | 4 | 1 | 0 | x | Yes |

METHOD FOR CALL PROCESSING AND LINK TEST IN A VOIP GATEWAY AND SYSTEM THEREOF

CLAIM OF PRIORITY

This application makes reference to, incorporates the same herein, and claims all benefits accruing under 35 U.S.C. §119 from an application for METHOD FOR CALL PROCESSING AND LINK TEST IN A VoIP GATEWAY AND SYSTEM THEREOF earlier filed in the Korean Intellectual Property Office on 16 Dec. 2002 and there duly assigned Serial No. 2002/80465.

BACKGROUND OF THE INVENTION

1. Field of the Invention

The present invention relates to a Voice over Internet Protocol (VoIP) system, and more particularly, to a method for call processing and link test in a Voice over Internet Protocol (VoIP) Gateway and system thereof, capable of dispersing gatekeeper traffic and improving service quality at the same time, by distinguishing whether or not a gatekeeper has been used in accordance with an access code (e.g. trunk code or area code) and performing a link test and Voice over Internet Protocol (VoIP) call processing.

2. Description of the Related Art

As the name implies, Voice over Internet Protocol (VoIP) is a communication technology using Internet protocol and provides voice call service, multimedia video conference and so forth. Because of interworking between an IP (Internet Protocol) network and a Public Switch Telephone Network (PSTN), application of Voice over Internet Protocol (VoIP) has also been expanded to a variety of equipment and application services. That is, a VoIP service sends videos, voices, and fax messages over the Internet, and uses a real-time protocol (RTP) to help ensure that packets get delivered in a timely way when transmitting real-time media such as voices and videos; and in many cases when a user who wants to use the Internet, access to the Internet is provided by a PC (Personal Computer) or by using an independent device (e.g., Internet phone) applied with an Internet protocol (IP), by making a call to a Gateway from an existing PSTN (Public Switched Telephone Network) terminal.

To perform the VoIP service, a unit for searching the other party and signaling is necessary. There are two kinds of VoIP signaling units, such as H.323 of ITU-T (International Telecommunication Standardization Sector) and an SIP (Session Initiation Protocol) of IETF (Internet Engineering Task Force).

A VoIP service network is divided into two kinds, namely a network being operated using a gatekeeper and a network being operated without a gatekeeper.

In general, a network is a series of points or nodes interconnected by communication paths. Networks can interconnect with other networks and contain subnetworks. The most common topology or general configurations of networks include the bus, star, and token ring topologies. Networks can also be characterized in terms of spatial distance as local area networks (LAN), metropolitan area networks (MAN), and wide area networks (WAN). A given network can also be characterized by the type of data transmission technology in use on it (for example, a TCP/IP or Systems Network Architecture network); by whether it carries voice, data, or both kinds of signals; by who can use the network (public or private); by the usual nature of its connections (dial-up or switched, dedicated or nonswitched, or virtual connections); and by the types of physical links (for example, optical fiber, coaxial cable, and Unshielded Twisted Pair).

Large telephone networks and networks using their infrastructure (such as the Internet) have sharing and exchange arrangements with other companies so that larger networks are created. A Gateway is a network point that acts as an entrance to another network. On the Internet, a node or stopping point can be either a Gateway node or a host (end-point) node. Both the computers of Internet users and the computers that serve pages to users are host nodes. The computers that control traffic within your company's network or at your local Internet service provider (ISP) are Gateway nodes. In the network for an enterprise, a computer server acting as a Gateway node is often also acting as a proxy server and a firewall server. On the Internet, a node or stopping point can be either a Gateway node or a host (end-point) node. Both the computers of Internet users and the computers that serve pages to users are host nodes. The computers that control traffic within a company's network or at a local Internet service provider (ISP) are Gateway nodes.

A gatekeeper is located between the Internet and a Gateway. A Gateway is often associated with both a router, which knows where to direct a given packet of data that arrives at the Gateway, and a switch, which furnishes the actual path in and out of the Gateway for a given packet. The gatekeeper's major functions include address translation for enabling voice calls between terminals (endpoints) by converting an alias (H.323 identifier, URL, phone number or e-mail address) to a transport address (IP address), and managing the status of remote (destination) Gateways and performing call routing processes accordingly.

To explain the network without gatekeeper first, a Gateway directly performs a link test on a remote (destination) Gateway to check the status of the remote Gateway. In this case, the Gateway performs the link test on every routable Gateway and checks their states, respectively.

On the other hand, when a gatekeeper is used, the gatekeeper manages each Gateway's channel information and status so there is no need for the Gateway to perform the link test itself.

Depending on what kind of Gateway is used, the Gateway using a gatekeeper can be operated in auto Registration/Admission/Status (RAS) mode or in manual Registration/Admission/Status (RAS) mode.

For one's information, Registration/Admission/Status (RAS) is a protocol involved with basic call routing (or call processing) operation between a gatekeeper and each terminal, or endpoint, (Gateway, H.323 terminal, MCU and the like) based on H.225 Call Signaling Protocol.

In auto RAS mode, the gatekeeper is absolutely used regardless of an access code of a telephone number (alias) being received to the Gateway, and in manual RAS mode, on the other hand, the gatekeeper may be or may not be used depending on the access code.

The following details the manual RAS mode that is dealt with primarily by the present invention.

The manual RAS mode provides RAS conditionally. For instance, if one makes a local Voice over Internet Protocol (VoIP) call to someone in a different place of the same company, the gatekeeper is not necessary because the call is free of charge.

On the other hand, if one makes a phone call to someone in another company through a Public Switched Telephone Network (PSTN), the call is charged for using the Public Switched Telephone Network (PSTN). Thus the gatekeeper needs to route a Voice over Internet Protocol (VoIP) call being currently made.

However, the Gateway in the manual RAS mode, despite of the access code using the gatekeeper, should perform the link test on the remote Gateway following the manual RAS, only causing a heavy traffic in the network.

SUMMARY OF THE INVENTION

It is, therefore, an object of the present invention to provide a method for call routing and link test in a Voice over Internet Protocol (VoIP) Gateway and system thereof, to disperse traffic in a gatekeeper by selectively performing a link test after deciding whether or not the gatekeeper should be used according to an access code, given that a Gateway using the gatekeeper is operated in manual Registration/Admission/Status (RAS) mode.

Another object of the present invention is to provide a method for call routing and link test in a Voice over Internet Protocol (VoIP) Gateway and system thereof, to distinguish a public Voice over Internet Protocol (VoIP) service for charging a Voice over Internet Protocol (VoIP) call from a local Voice over Internet Protocol (VoIP) service that does not require charging after deciding whether or not a gatekeeper should be used according to an access code when processing the Voice over Internet Protocol (VoIP) call, given that a Gateway using the gatekeeper is operated in manual Registration/Admission/Status (RAS) mode.

Still another object of the present invention is to provide a method for call routing and link test in a Voice over Internet Protocol (VoIP) Gateway and system thereof, to improve service reliability over the Voice over Internet Protocol (VoIP) network by processing a Voice over Internet Protocol (VoIP) call on a Public Switched Telephone Network (PSTN) instead, especially when a routable Gateway is not available due to an Internet Protocol (IP) network failure during a Voice over Internet Protocol (VoIP) call service.

To achieve the above object, there is provided a gatekeeper option table in a Gateway database over a Voice over Internet Protocol (VoIP) service network, including: a gatekeeper connection field for indicating whether or not gatekeeper of the Voice over Internet Protocol (VoIP) Gateway is in enable or disable mode; a Registration/Admission/Status (RAS) mode field for distinguishing auto and manual Registration/Admission/Status (RAS) modes; and a field for indicating whether or not the outbound routing table in a Gatekeeper (GK) enable mode is in enable or disable status.

Also, the outbound routing table of the Internet Protocol (VoIP) Gateway further includes a gatekeeper use field for indicating whether or not the gatekeeper is being used in accordance with each access code.

Another aspect of the present invention provides a link test method in a Voice over Internet Protocol (VoIP) system in which the link test is performed depending on a status of a gatekeeper of a Gateway in manual Registration/Admission/Status (RAS) mode, the method comprising the steps of: deciding whether a present status corresponds to a Gateway link test cycle; if the present status is the link test cycle, deciding, based on access code, whether a remote Gateway is using a gatekeeper, whereby if the remote Gateway is using the gatekeeper, routing a Voice over Internet Protocol (VoIP) call to the gatekeeper because the link test does not need to be performed, and if the remote Gateway is not using the gatekeeper, transmitting a link test data to the corresponding remote Gateway; and deciding whether there is an additional Gateway for the link test, whereby if there is the additional Gateway for the link test, deciding whether or not the remote Gateway is using the gatekeeper, and if there is no additional Gateway for the link test, timing out the present link test cycle and standing by for a next link test cycle.

Still another aspect of the present invention provides a method for routing a VoIP call depending on a status of a gatekeeper of a Gateway in manual Registration/Admission/Status (RAS) mode, the method comprising the steps of: searching digits of a Voice over Internet Protocol (VoIP) call received to the Gateway in an outbound routing table; deciding whether or not the Gateway is using a gatekeeper; if the Gateway is using the gatekeeper, deciding a status of Registration/Admission/Status (RAS) mode, whereby in case that the Gateway is in auto Registration/Admission/Status (RAS) mode or in manual Registration/Admission/Status (RAS) mode, and an access code indicates the Gateway is using the gatekeeper, routing the Voice over Internet Protocol (VoIP) call to the gatekeeper, and in case the Gateway is in manual Registration/Admission/Status (RAS) mode, deciding whether the Gateway corresponding to the access code is using the gatekeeper; if the Gateway is not using the gatekeeper and the access code tells that the Gateway is in manual Registration/Admission/Status (RAS) mode and not using the gatekeeper, searching a remote Gateway for routing according to the access code and checking a status of the remote Gateway; and if the status of the remote Gateway is in routing enable status, routing the Voice over Internet Protocol (VoIP) call to the remote Gateway.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
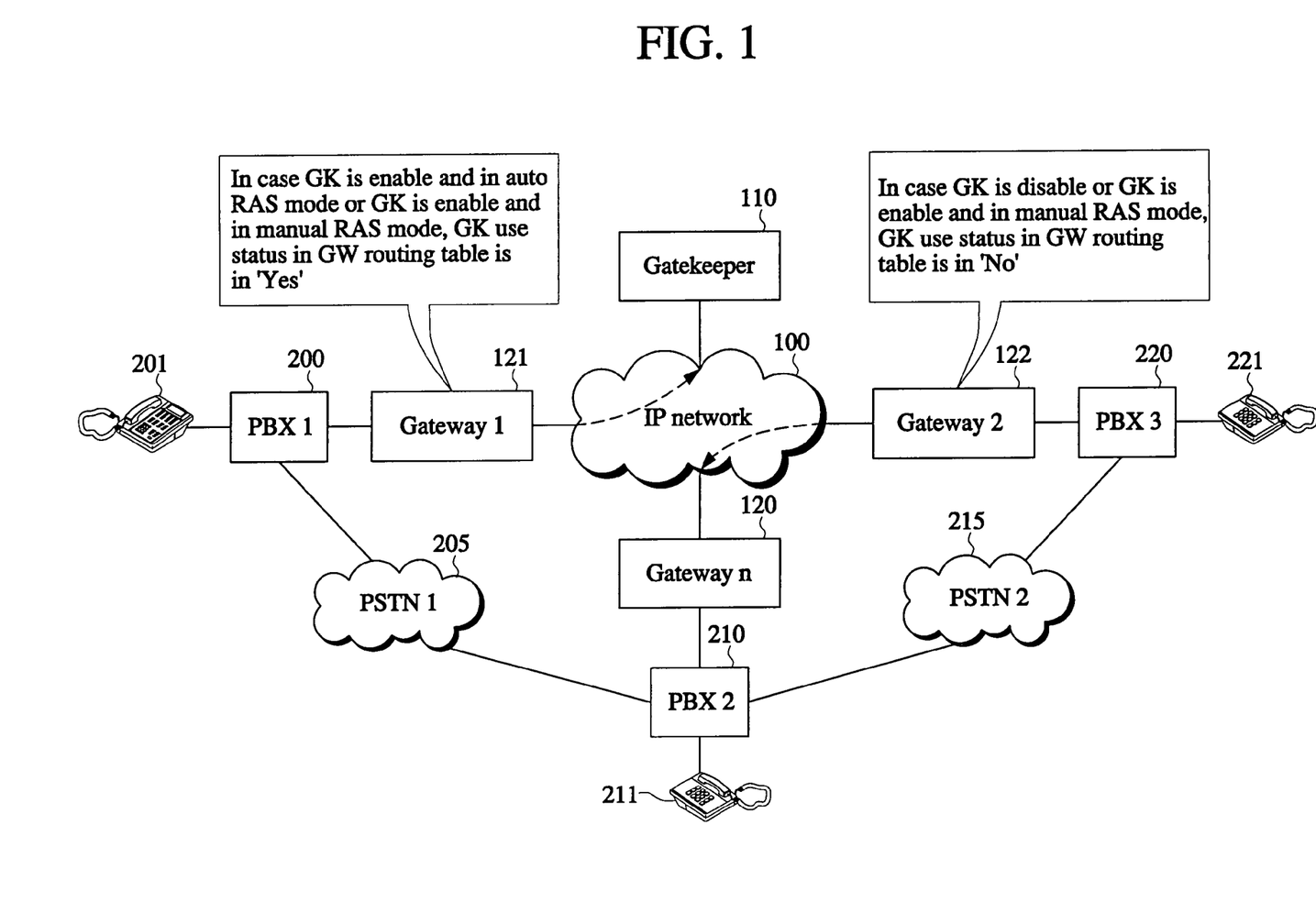
FIG. 1 is a schematic diagram illustrating a Voice over Internet Protocol (VoIP) service network connection to which the present invention is applied.

FIG. 1 is a conceptual diagram depicting Voice over Internet Protocol (VoIP) service network to which the present invention is applied.

As shown in FIG. 1, the Voice over Internet Protocol (VoIP) service network of the present invention is composed of a backbone Internet Protocol (IP) network 100, a plurality of Gateways 120, 121, and 122 that are connected to the IP network 100, and optionally a Gatekeeper 110 if needed.

The Gateways 120, 121, and 122 are connected to a private branch exchange (hereinafter referred to as 'PBX') and the PBX 1 (200) connects a transmitted call from a local terminal 201 to either Public Switched Telephone Network (PSTN) 1 (205) if the call is a general outbound call or to a Gateway 1 (121) if the call requests a Voice over Internet Protocol (VoIP) connection.

PBX 2 (210) is connected to a Gateway n (120), connecting a transmitted call from the local terminal 211 to Gateway n (120) if the call requests a Voice over Internet Protocol (VoIP) connection.

In like manner, PBX 3 (220) is connected to a Gateway 2 (122), connecting a transmitted call from the local terminal 211 to the Gateway 2 (122) if the call requests a Voice over Internet Protocol (VoIP) connection.

Having the above structure, adding a field, for indicating whether or not a Gatekeeper is being used, to a Gatekeeper option table (FIG. 2) and to a Gateway outbound routing table (FIG. 3) in a database of a Gateway, both being operated in manual RAS mode, it becomes possible to find out whether the Gatekeeper is being used according to an access code.

If the Gateway 1(121) is operated in auto RAS mode, a call goes through the Gatekeeper. Therefore, when the Gatekeeper 110 is in enable state, a call is routed to the Gatekeeper 110.

In addition, if the Gateway 1 (121) is operated in manual RAS mode while the Gatekeeper 110 is in enable state, a call is routed to the Gatekeeper 110 only when Gatekeeper 110 use in the Gateway outbound routing table is 'Yes'.

On the other hand, in case of the Gateway 2 (122) where the Gatekeeper 110 is in disable state (i.e. the Gateway 2 (122) does not use the Gatekeeper regardless of RAS mode), a Voice over Internet Protocol (VoIP) call is directly routed to a remote Gateway n (120) all the time.

Also, when the Gateway 2 (122) is operated in manual RAS mode while the Gatekeeper 110 is in enable state, the Voice over Internet Protocol (VoIP) call is directly routed to the Gateway n (120) without going through the Gatekeeper 110 especially when the Gatekeeper 110 use in the Gateway outbound routing table is 'No'.

Figure 2:
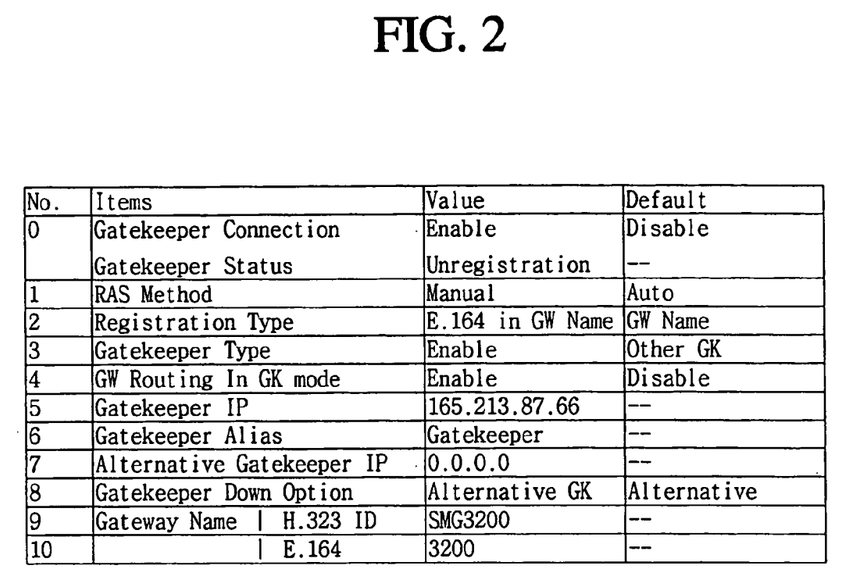
FIG. 2 illustrates a Voice over Internet Protocol (VoIP) gatekeeper option table of a Gateway according to an embodiment of the present invention.
Figure 3:
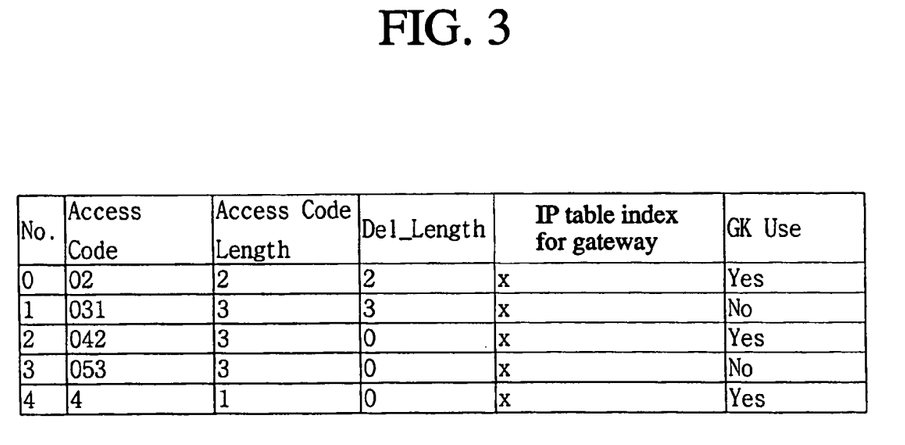
FIG. 3 illustrates a Voice over Internet Protocol (VoIP) outbound routing table of a Gateway according to another embodiment of the present invention.

The following describes table configurations in Gateway database with reference to FIGS. 2 and 3.

FIG. 2 illustrates the Voice over Internet Protocol (VoIP) Gatekeeper option table of a Gateway database according to one embodiment of the present invention, and FIG. 3 illustrates a Voice over Internet Protocol (VoIP) outbound routing table of a Gateway database according to another embodiment of the present invention.

In the Voice over Internet Protocol (VoIP) Gatekeeper option table referring to FIG. 2, 'No. 0' defines a 'Gatekeeper Connection' field for indicating whether Gateways are connected to each other and a 'Gatekeeper Status' field to indicating whether the gatekeeper is registered or unregistered; No. 1 defines a 'Registration/Admission/Status (RAS) Method' field for indicating the RAS mode; and No. 4 defines a 'Gateway (GW) Routing In Gatekeeper (GK) mode' field for indicating whether or not the outbound routing table of the Gateway in Gatekeeper enable mode should be used.

Since the other items not mentioned above are equivalent with ones in a Gatekeeper option table of a related art, there will not be description on them.

The Gateway has not only the Gatekeeper option table but also the outbound routing table. This outbound routing table used to be prepared in a Gatekeeper of the related art.

However, as functions of a Gateway have been improved, I propose that part of the Gatekeeper's functions now be performed by the Gateway itself.

In fact, the outbound routing table is one of those things, according to the present invention, the Gateway now possesses in its database. The outbound routing table converts (reprocesses) a telephone number received by the Gateway into a telephone number appropriate for Voice over Internet Protocol (VoIP) network by using an access code, access code length, or del_length, as shown in FIG. 3.

Besides this routing function through processing the telephone number, there is an additional field in the outbound routing table, which decides whether or not to use the Gatekeeper according to an access code, thereby indicating whether the Gatekeeper is in an enable or disable state according to the access code.

For example, suppose that an originator requests a Voice over Internet Protocol (VoIP) call from Seoul (02) to Kyunggi province (031-**-). Then the designation telephone number (031--**) is sent to a Gateway connected to the PBX through the PBX connected to an originating terminal.

Knowing that the access code of the telephone number is 031, the Gateway checks a use status (GK use) of the access code of Gatekeeper 110, and if it is 'No', directly connects the Voice over Internet Protocol (VoIP) call to a corresponding remote Gateway without connecting to the Gatekeeper. This is a case where an originator makes a call to another person of the same company yet in a different location (e.g. local VoIP service). Every local Voice over Internet Protocol (VoIp) service is free of charge so there is no need to use the Gatekeeper.

Meanwhile, if the originator requests a Voice over Internet Protocol (VoIP) connection from Seoul (02) to Daejeon (042-**-), the designation telephone number (042--**) is sent to the Gateway connected to the PBX through the PBX connected to an originating terminal.

Using the access code '042' of the alias (telephone number), the Gateway checks the use status (GK use) of the access code of Gatekeeper 110, and if it is 'Yes', has the Voice over Internet Protocol (VoIP) call goes through the Gatekeeper 110, and exchanges a RAS signal at the Gatekeeper, eventually routing the call to the proper remote Gateway. This is a case where an originator makes an outbound call to another person of a different company in a different area (e.g. public VoIP service). This type of call is always charged and that is why it goes through the Gatekeeper.

Explained now is a method, according to the present invention, for performing a link test with or without using the Gatekeeper 110 given that the Gateway has the database described above and a method for routing (processing) Voice over Internet Protocol (VoIP) calls.

Figure 4:
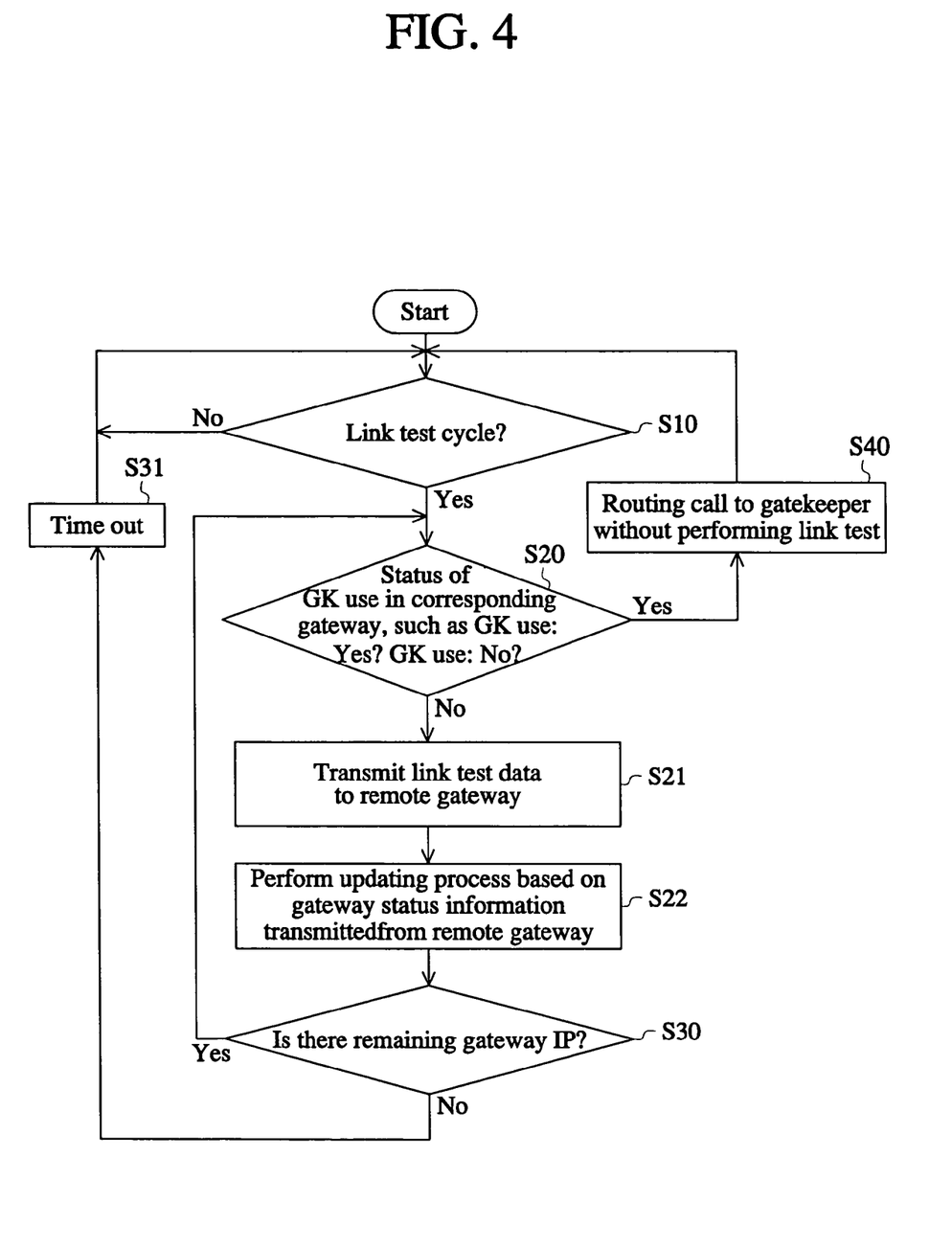
FIG. 4 is a flow chart explaining a method for performing a link test in manual Registration/Admission/Status (RAS) mode using a gatekeeper, and whether the Gatekeeper is to be used or not based on an access code according to yet another embodiment of the present invention.
Figure 5:
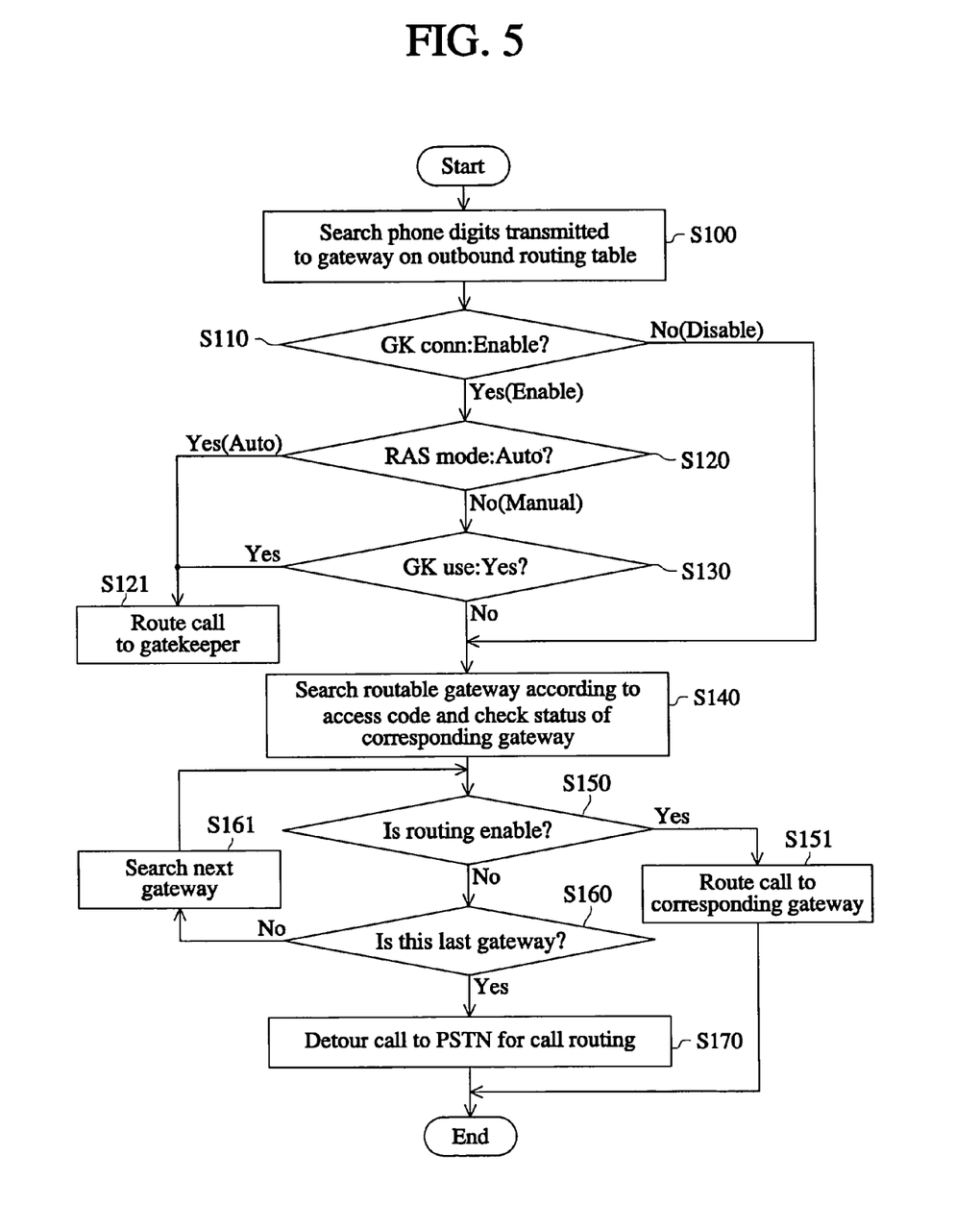
FIG. 5 is a flow chart explaining a method for routing a Voice over Internet Protocol (VoIP) call in a manual Registration/Admission/Status (RAS) mode using a Gatekeeper, and whether the Gatekeeper is to be used or not based on an access code according to a further embodiment of the present invention.

FIG. 4 is a flow chart explaining the method for performing a link test in manual RAS mode using a Gatekeeper (GK), and whether the Gatekeeper is to be used or not according to each access code, and FIG. 5 is a flow chart explaining the method for routing a Voice over Internet Protocol (VoIP) call in manual RAS mode using a Gatekeeper, and whether the Gatekeeper is to be used or not according to each access code.

To begin with, the method for performing a link test is explained with reference to FIG. 4.

In the following description, it is assumed that a Gateway is operating in a manual RAS mode using a Gatekeeper. If the Gateway being operated in manual RAS mode has to use a Gatekeeper, the following procedure will not be needed.

First, the Gateway decides whether it is time to conduct the link test on any remote Gateways (S10) within its zone. If so, the Gateway searches the outbound routing table for a Gateway to perform the link test on, and using an access code, finds out whether or not the Gatekeeper is to be used by checking the Gatekeeper (GK) use field of the corresponding access code to see if the Gatekeeper use is in 'Yes' or 'No' (S20).

If the GK use corresponding access code in the routing table is in 'Yes', it means that the Gatekeeper is to be used to access the remote Gateway. Thus the link test is not performed at the Gatekeeper and the call is directly routed to the Gatekeeper, thereby enabling the Gatekeeper to manage channel information and status of the Gateway (S40).

However, if the GK use in the routing table is in 'No', the remote Gateway on which the link test to be performed is searched out and the link test data is transmitted to the corresponding remote Gateway (S21).

When an answer signal to the link test data is received from the remote Gateway, an updating process is performed depending on the status information of the remote Gateway (S22). It is then decided whether there are more remote Gateways to perform the link test thereon (S30) by checking the IP table index for Gateway portion of the Gateway outbound routing table, and if there are, the above procedure starting from the step S20 is carried out again for each remote Gateway.

At the step S30, if there is no further remote Gateway, it means that every thing that is supposed to be done during the present link test cycle has been completed. Therefore, a time-out is performed and the procedure returns to step S10.

Briefly, the link test is selectively performed based on the GK use status according to each access code that defined in Access Code field of the Gateway outbound routing table, so it is possible to disperse traffic in the Gatekeeper without performing the link test that used to be carried out for every access code using a Gatekeeper according to the related art.

Referring to FIG. 5, explained now is the procedure for processing (routing) actual Voice over Internet Protocol (VoIP) calls.

In this procedure, the case where the originator makes an outbound call through a PSTN is excluded and only the case where the originator makes a Voice over Internet Protocol (VoIP) call is included.

When the originator makes a Voice over Internet Protocol (VoIP) call, digits are transmitted to a corresponding Gateway, and the Gateway searches out the received digits in the outbound routing table in its database (S100).

To check if the Gateway is using a Gatekeeper, the status of Gatekeeper Connection (hereinafter referred to as 'GK conn') of the Gatekeeper use option table in the database is compared (S110).

At the step S110, if the GK conn is in 'Disable', it means that the Gateway is not using a Gatekeeper at the moment. Therefore, the Gateway personally has to find another Gateway for routing.

If the GK conn is in 'Enable', on the other hand, it means that the Gateway is using a Gatekeeper. In this case, the RAS mode of the Gateway is checked (S120). If it turns out that the Gateway is in auto RAS mode, indicating that a Gatekeeper is being used for every Voice over Internet Protocol (VoIP) call, the call is routed to the Gatekeeper without exception (S121).

In the meantime, if it turns out that the Gateway is in manual RAS mode (S120), the GK use is determined based on an access code for the corresponding Voice over Internet Protocol (VoIP) call (S130).

At the step S130, if the GK use is in 'Yes', the Voice over Internet Protocol (VoIP) call is supposed to go through the Gatekeeper and be routed. Thus the Voice over Internet Protocol (VoIP) call is routed to the Gatekeeper (S120).

However, if the GK use is in 'No', the Voice over Internet Protocol (VoIP) call is supposed to be routed to a remote Gateway directly without going through the Gatekeeper. Thus the Gateway searches out another Gateway for routing based on an access code of the corresponding Voice over Internet Protocol (VoIP) call, and checks the status of the corresponding Gateway (S140).

Following the step S140, it is decided if the corresponding (remote) Gateway is in a status where routing is possible (S150), and if routing is possible, the Voice over Internet Protocol (VoIP) call is routed to the corresponding Gateway (S151).

However, if routing is not possible at the step S150, and if the Gateway at the step S160 is not the last one available, a next Gateway is searched out for routing (S161), and the step S150 is conducted.

When the remote Gateway happens to be the last Gateway available for routing (S160), it is most likely to cause an entire Internet Protocol (IP) network failure, packet delay and packet loss, and the Gateway is not in the position to perform call routing (processing) for those reasons. Therefore, the call processing is performed in the Public Switched Telephone Network (PSTN) instead (S170).

Checking the status of the GK use for each access code, if the Gatekeeper is being used, the Voice over Internet Protocol (VoIP) call goes through the Gatekeeper to be routed. The Gatekeeper then puts a charge on the call. If the Gatekeeper is not being used, however, the Voice over Internet Protocol (VoIP) call is directly routed to the Gateway and no charge is put on the call.

In addition, reliability of a communication network can be greatly improved by having the Public Switched Telephone Network (PSTN) process the call in case there is no Gateway for routing.

In conclusion, the present invention can be advantageously used for dispersing traffic in a Gatekeeper and further securing reliability of call routing over a Voice over Internet Protocol (VoIP) network, by adding a Gatekeeper use field to an outbound routing table of the Gateway for each Voice over Internet Protocol (VoIP) call according to an access code and thereby selectively performing a link test that used to be performed for every access code that uses Gatekeeper.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A Voice over Internet Protocol (VoIP) Gateway including:
   a Gatekeeper option table in a database thereof, the Gatekeeper option table comprising:
   a Gatekeeper connection field for indicating whether or not a Gatekeeper of the VoIP Gateway is in an enable or disable mode;
   a Registration/Admission/Status (RAS) mode field for distinguishing auto Registration/Admission/Status (RAS) mode and manual Registration/Admission/Status (RAS) mode; and
   a field for indicating whether or not an outbound routing table in a Gatekeeper (GK) enable mode is in an enable or disable status.

2. The Voice over Internet Protocol (VoIP) Gateway according to claim 1, wherein the outbound routing table is in the database of the Gateway and comprises a Gatekeeper use field for indicating whether or not the Gatekeeper is being used in accordance with each access code in an access code field.

3. A link test method in a Voice over Internet Protocol (VoIP) system in which a link test is performed depending on a status of a Gatekeeper of a local Gateway in manual Registration/Admission/Status (RAS) mode, the method comprising steps of:
   determining whether a present status of the local Gateway corresponds to a Gateway link test cycle;
   searching an outbound routing table in said local Gateway for a remote Gateway to perform the link test on, when it is determined that the present status is the Gateway link test cycle;
   checking an access code, in said outbound routing table, corresponding to said remote Gateway;
   determining, based on said access code, whether said remote Gateway is using a Gatekeeper; and
   transmitting link test data to the remote Gateway if the remote Gateway is not using the Gatekeeper.

4. The method as set forth in claim 3, further comprising steps of:
   updating information of the remote Gateway, when an answer signal to the link test data is received from the remote Gateway;
   searching said outbound routing table in said local Gateway again to determine whether there is an additional remote Gateway to perform the link test on;
   returning to said checking step and checking an access code, in said outbound routing table, corresponding to said additional remote Gateway, when it is determined that there is an additional remote Gateway to perform the link test on.

5. The method as set forth in claim 3, further comprising steps of:
   routing a Voice over Internet Protocol (VoIP) call to the Gatekeeper without performing the link test; and
   returning to the step of determining whether a present status of the local Gateway corresponds to a Gateway link test cycle.

6. The method as set forth in claim 4, further comprising steps of:
   routing a Voice over Internet Protocol (VoIP) call to the Gatekeeper without performing the link test; and
   returning to the step of determining whether a present status of the local Gateway corresponds to a Gateway link test cycle.

7. The method as set forth in claim 6, further comprising a step of:
   timing out the present link test cycle and standing by for a next link test cycle if there is no additional remote Gateway to perform the link test on.

8. A method for routing a Voice over Internet Protocol (VoIP) call depending on a status of a Gatekeeper of a Gateway and a status of a Registration/Admission/Status (RAS) mode of the Gateway, the method comprising steps of:
   searching an outbound routing table in a database of said Gateway for telephone digits received by the Gateway of a Voice over Internet Protocol (VoIP) call;
   checking a Gatekeeper option table in the database of said Gateway to determine whether or not a Gatekeeper connection state is in an enable state;
   checking the Gatekeeper option table to determine whether the status of the Registration/Admission/Status (RAS) mode is in an auto mode when it is determined that the Gatekeeper connection state is in an enable state; and
   routing the Voice over Internet Protocol (VoIP) call to the Gatekeeper when it is determined that the status of the Registration/Admission/Status (RAS) mode is in the auto mode.

9. The method as set forth in claim 8, further comprising steps of:
   checking an access code field in said outbound routing table for an access code corresponding to the telephone digits to determine whether a status of a corresponding Gatekeeper use in a Gatekeeper use field of said outbound routing table is a yes state, when it is determined that the status of the Registration/Admission/Status (RAS) mode is in not the auto mode; and
   routing the Voice over Internet Protocol (VoIP) call to the Gatekeeper when it is determined that the status of the corresponding Gatekeeper use is the yes state.

10. The method as set forth in claim 8, further comprising steps of:
    searching said outbound routing table in said local Gateway for a remote Gateway corresponding to said access code, when it is determined that the Gatekeeper connection state is not in an enable state;
    checking a status of the remote Gateway corresponding to said access code to determine whether routing a call thereto is possible; and
    routing the Voice over Internet Protocol (VoIP) call to the remote Gateway, when it is determined that routing a call thereto is possible.

11. The method as set forth in claim 8, further comprising steps of:
    searching said outbound routing table in said local Gateway for a remote Gateway corresponding to said access code, when it is determined that the status of the corresponding Gatekeeper use is not the yes state;
    checking a status of the remote Gateway corresponding to said access code to determine whether routing a call thereto is possible; and
    routing the Voice over Internet Protocol (VoIP) call to the remote Gateway, when it is determined that routing a call thereto is possible.

12. The method as set forth in claim 10, further comprising steps of:
    determining whether or not the remote Gateway corresponding to said access code is the last remote Gateway listed in said outbound routing table, when it is determined that routing a call to the remote Gateway is not possible;

searching said outbound routing table for a next Gateway and checking a status of the next Gateway to determine whether routing a call thereto is possible, when it is determined that the remote Gateway corresponding to said access code is not the last remote Gateway listed in said outbound routing table; and routing the Voice over Internet Protocol (VoIP) call to said next Gateway, when it is determined that routing a call to said next Gateway is possible.

13. The method as set forth in claim 11, further comprising steps of:

determining whether or not the remote Gateway corresponding to said access code is the last remote Gateway listed in said outbound routing table, when it is determined that routing a call to the remote Gateway is not possible;

searching said outbound routing table for a next Gateway and checking a status of the next Gateway to determine whether routing a call thereto is possible, when it is determined that the remote Gateway corresponding to said access code is not the last remote Gateway listed in said outbound routing table; and routing the Voice over Internet Protocol (VoIP) call to said next Gateway, when it is determined that routing a call to said next Gateway is possible.

14. The method as set forth in claim 10, further comprising steps of:

determining whether or not the remote Gateway corresponding to said access code is the last remote Gateway listed in said outbound routing table, when it is determined that routing a call to the remote Gateway is not possible; and routing the Voice over Internet Protocol (VoIP) call to a public switched telephone network (PSTN), when it is determined that the remote Gateway is the last remote Gateway listed in said outbound routing table.

15. The method as set forth in claim 11, further comprising steps of:

determining whether or not the remote Gateway corresponding to said access code is the last remote Gateway listed in said outbound routing table, when it is determined that routing a call to the remote Gateway is not possible; and routing the Voice over Internet Protocol (VoIP) call to a public switched telephone network (PSTN), when it is determined that the remote Gateway is the last remote Gateway listed in said outbound routing table.

16. The method as set forth in claim 12, further comprising a step of routing the Voice over Internet Protocol (VoIP) call to a public switched telephone network (PSTN), when it is determined that the remote Gateway is the last remote Gateway listed in said outbound routing table.

17. The method as set forth in claim 13, further comprising steps of routing the Voice over Internet Protocol (VoIP) call to a public switched telephone network (PSTN), when it is determined that the remote Gateway is the last remote Gateway listed in said outbound routing table.

* * * * *